(12) United States Patent
Barkan et al.

(10) Patent No.: US 9,008,428 B2
(45) Date of Patent: Apr. 14, 2015

(54) EFFICIENT VERIFICATION OR DISAMBIGUATION OF CHARACTER RECOGNITION RESULTS

(71) Applicant: International Business Machines Corporation, Armonk, NY (US)

(72) Inventors: Ella Barkan, Haifa (IL); Itoko Toshinari, Kanagawa (JP); Asaf Tzadok, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 13/751,176

(22) Filed: Jan. 28, 2013

(65) Prior Publication Data

US 2014/0212039 A1     Jul. 31, 2014

(51) Int. Cl.
| | | |
|---|---|---|
| G06K 9/34 | (2006.01) | |
| G06K 9/46 | (2006.01) | |
| G06K 9/03 | (2006.01) | |
| G06K 9/68 | (2006.01) | |

(52) U.S. Cl.
CPC ............ G06K 9/033 (2013.01); G06K 9/685 (2013.01)

(58) Field of Classification Search
CPC ......... G06K 9/18; G06K 9/186; G06K 9/228; G06K 2209/01; G06K 9/03; G06K 9/6261
USPC ......... 382/173, 177, 178, 181, 190, 209, 217, 382/187, 182, 183, 159, 155, 195, 203, 224, 382/225, 312, 321, 226, 227, 188, 185, 161, 382/197, 198, 199, 174, 228, 215, 206, 309, 382/310; 235/470, 435, 439, 454; 704/200, 704/231, 251, 254
See application file for complete search history.

(56) References Cited

U.S. PATENT DOCUMENTS

| | | | |
|---|---|---|---|
| 5,455,875 A | 10/1995 | Chevion et al. | |
| 6,351,574 B1 | 2/2002 | Yair et al. | |
| 6,760,490 B1 | 7/2004 | Zlotnick | |
| 7,039,256 B2* | 5/2006 | Zlotnick et al. | 382/311 |
| 7,111,255 B2 | 9/2006 | Zlotnick | |
| 7,697,758 B2* | 4/2010 | Vincent et al. | 382/177 |
| 8,103,132 B2 | 1/2012 | Tzadok et al. | |
| 8,116,567 B2 | 2/2012 | Tzadok et al. | |
| 8,749,531 B2* | 6/2014 | Pasquero et al. | 345/177 |
| 2008/0212877 A1 | 9/2008 | Franco | |

OTHER PUBLICATIONS

IBM Research, Almaden, "User Interface Solutions", IBM Research, Almaden, Nov. 8, 2002. URL: http://web.archive.org/web/20021108150631/http://www.almaden.ibm.com/cs/DARE/ui.html.

* cited by examiner

*Primary Examiner* — Sheela Chawan
(74) *Attorney, Agent, or Firm* — Isaac J. Gooshaw; Jason H. Sosa

(57) ABSTRACT

Machines, systems and methods for character recognition disambiguation are provided. The method comprises selecting a first set of characters that match a first visual profile based on results of a character recognition process applied to target content; selecting a subset of the first set based on criteria associated with at least one of confidence level with which characters grouped in the subset are recognized or fragmentation associated with the characters grouped in the subset; and disambiguating recognition results for the characters grouped in the subset by displaying the characters along with context information, wherein reviewing two or more of the characters on a display screen along with context information associated with said two or more characters allows a human operator to select one or more suspect characters from among the two or more characters.

20 Claims, 6 Drawing Sheets

EFFICIENT VERIFICATION OR DISAMBIGUATION OF CHARACTER RECOGNITION RESULTS

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to character recognition and to providing a human user with a tool to accurately and efficiently identify suspect characters that may be recognized in error.

BACKGROUND

Optical character recognition (OCR) systems are configured to scan text content and automatically recognize the individual characters in the text content. Often, some characters are recognized with higher levels of confidence and some characters are recognized with lower levels of confidence. Those characters that are recognized with a confidence level below a certain threshold may be referred to as suspect characters. After further diligence and analysis by a human operator, for example, the suspect characters may be filtered out or recognized with higher accuracy.

Referring to FIG. 1, for example, in an attempt to achieve higher recognition accuracy, the characters that match a visual profile may be displayed to a user in a so-called "carpet" format allowing a user to view and select the suspect characters. As shown, the carpet format refers to the visual presentation of a selected group of characters in a row-column format, where individual characters with same OCR results are presented next to each other in rows and columns.

The particular side-by-side visual presentation format (i.e., a visual carpet of individual characters) is particularly desirable, as it allows a human operator to easily identify the suspect characters that do not belong in the selected group. A human operator, however, may be unable to fully appreciate the context in which an individual character is used in the original content based on a viewing of the individual character within the blind setting of a visual carpet. Lack of such appreciation may lead to error.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Machines, systems and methods for character recognition disambiguation are provided. The method, in one embodiments comprises selecting a first set of characters that match a first visual profile based on results of a character recognition process applied to target content; selecting a subset of the first set based on criteria associated with at least one of confidence level with which characters grouped in the subset are recognized or fragmentation associated with the characters grouped in the subset; and disambiguating recognition results for the characters grouped in the subset by displaying the characters along with context information, wherein reviewing two or more of the characters on a display screen along with context information associated with said two or more characters allows a human operator to select one or more suspect characters from among the two or more characters.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
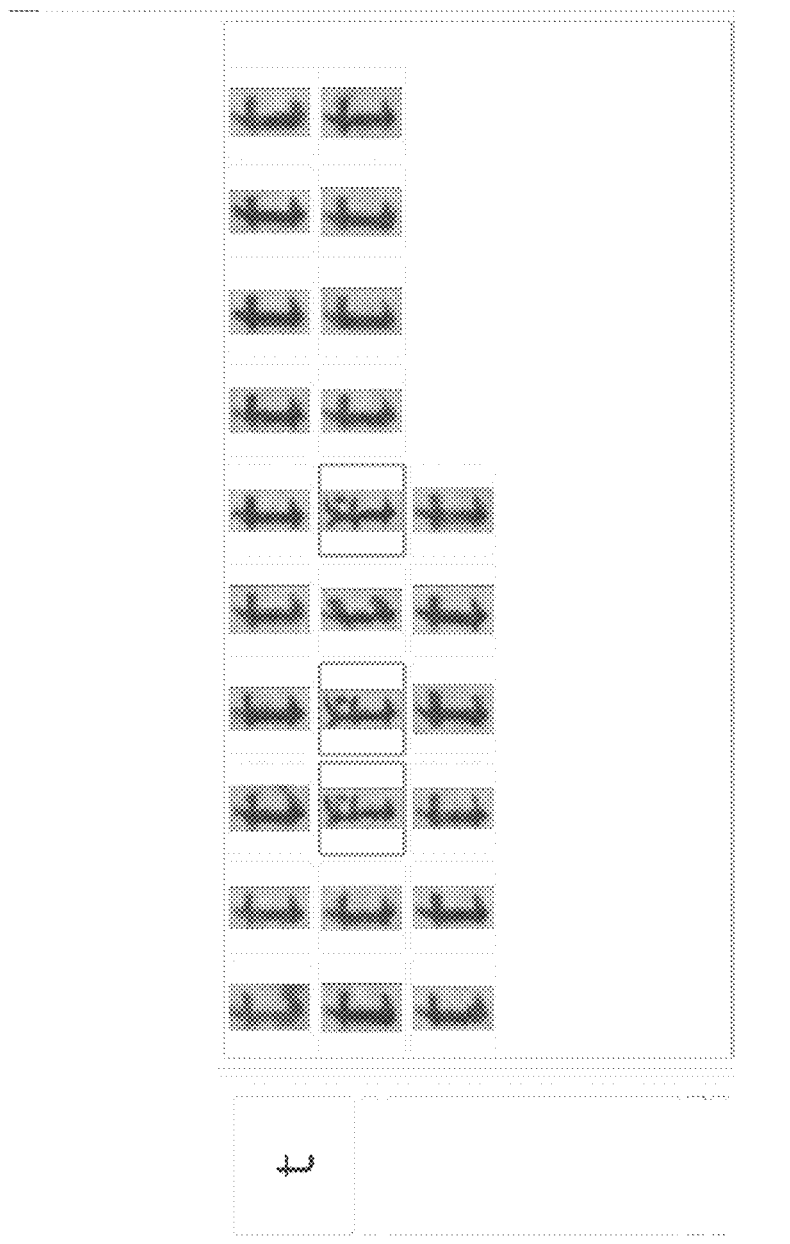
FIG. 1 illustrates an exemplary graphical user interface displayed to a human operator to allow the human operator to select, from a group of characters, those characters that do not belong to the group.
Figure 2:
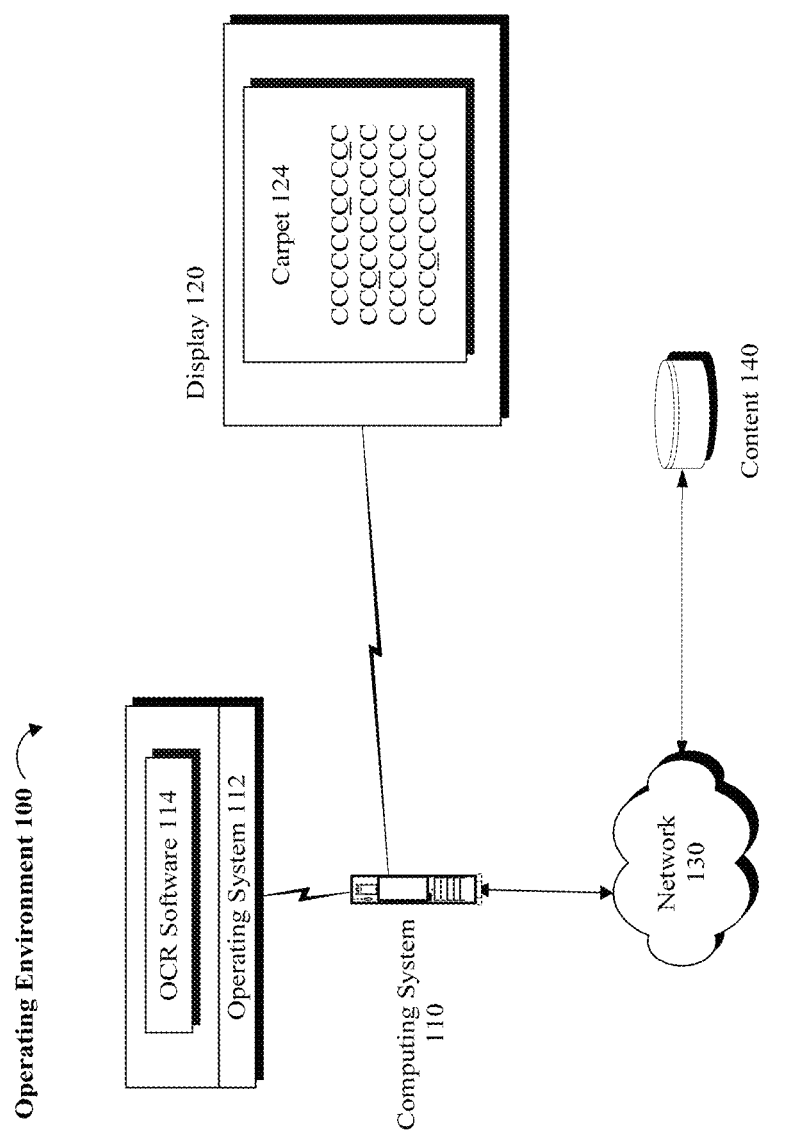
FIG. 2 is an exemplary block diagram of an operating environment in which character recognition may be applied to certain content, in accordance with one embodiment.

Referring to FIG. 2, an exemplary operating environment 100 is illustrated in which character recognition (e.g., OCR) software 114 is executed on top of operating system 112 loaded on a computing system 110. In accordance with one embodiment, computing system 110 may be connected, by way of a network 130, to a data storage medium that includes content 140. A display 120 may be utilized to display character recognition results generated by software 114 and other visual presentations, including a character carpet 124, as provided in further detail below.

Figure 3A:
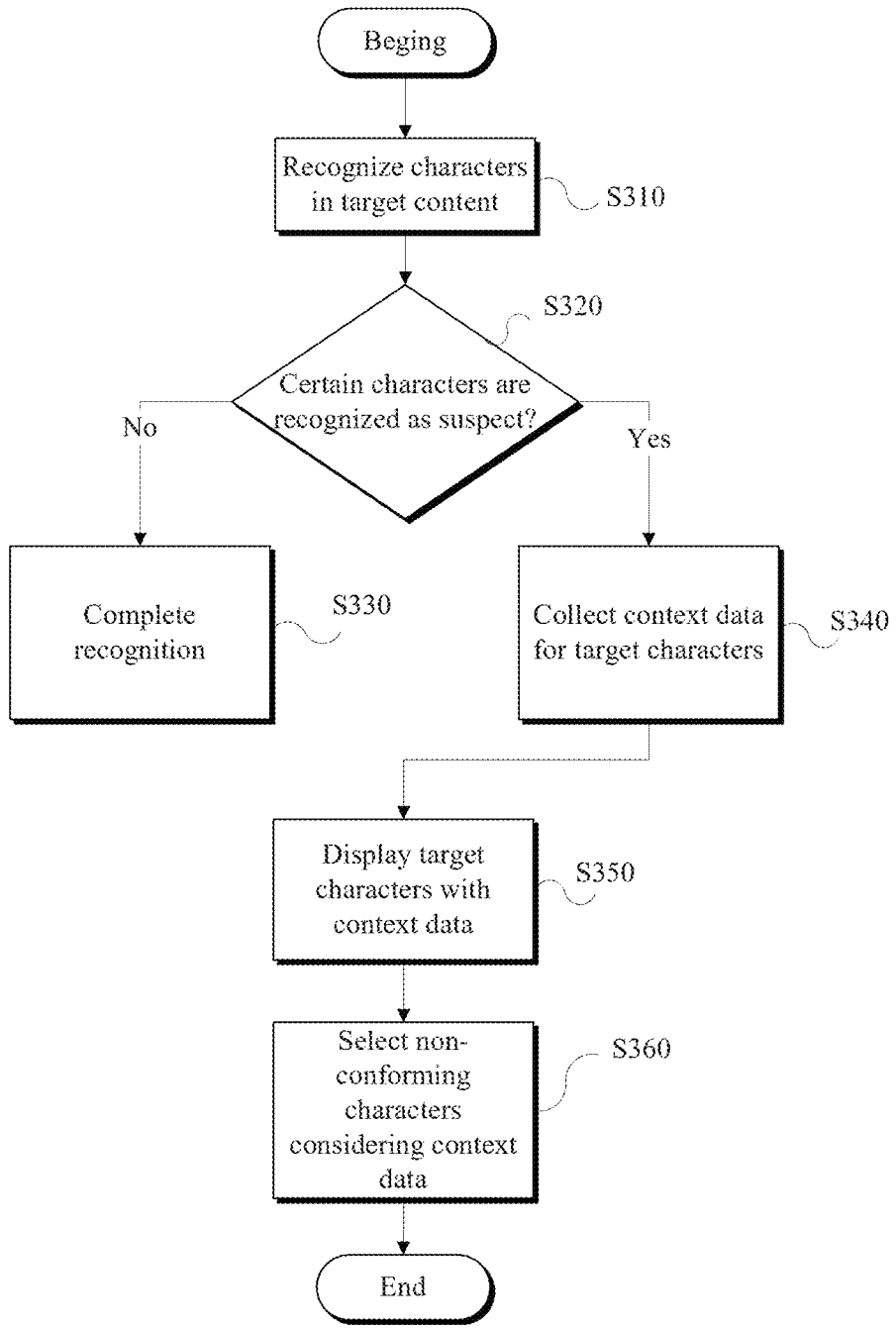
FIG. 3A is a flow diagram of a method of providing context data for individual characters displayed in the graphical user interface, in accordance with one embodiment.

Referring to FIG. 3A, software 114 may be used to recognize characters in content 140 using one or more recognition techniques (S310). Once the proper recognition processes have been performed, a certain number of characters may be identified with higher levels of confidence and certain suspect characters may be recognized with lower levels of confidence. As such, some characters may be recognized as suspect, as provided in further detail below (S320). For certain characters that have been recognized with a confidence level above a threshold, recognition may be deemed completed (S330).

In one embodiment, for characters that are recognized below a threshold confidence level (or if the characters are recognized with high confidence but the recognition requires disambiguation) further analysis may be performed to recognize the character with a higher level of accuracy. For example, as a part of further analysis, characters that seem to be wrongly recognized due to bad fragmentation may be identified. In another scenario, characters that may have more than one possible recognition candidate (e.g., lower case L ["l"] vs. the number one ["1"]) may be further processed to determine the correct candidate.

The additional processing may utilize a dictionary to accurately recognize (i.e., postulate) a character by way of considering the surrounding characters and the proper spelling of the word containing the character, for example. Or as another example, it may be suspected that recognition is fragmented (e.g., characters' rectangles may be overlapping, if the characters are too narrow or too wide, or if some improper sequence of narrow rectangles such as "iii" or "lll" is identified).

The suspect characters, in one embodiment, may be further sub-clustered according to certain criteria, including but not limited to criteria that apply to the visual presentation of the characters, the neighboring characters and other information that provide information about the context of the character in the original content. Accordingly, context data for certain target characters (e.g., the suspect characters or non-suspect characters that meet the criteria) may be collected (S340).

In accordance with one embodiment, the target characters (including some suspect characters) may be displayed to a user in one or more visual formats so that the user may view and select one or more characters. The various visual formats may comprise a grid or a carpet format where the characters are visually presented in a row-column format. Characters with similar or same morphology and same recognition results may be presented next to each other. The particular visual presentation format (i.e., a visual carpet of characters) is desirable, in some embodiments, due to human training and preference.

Figure 3B:
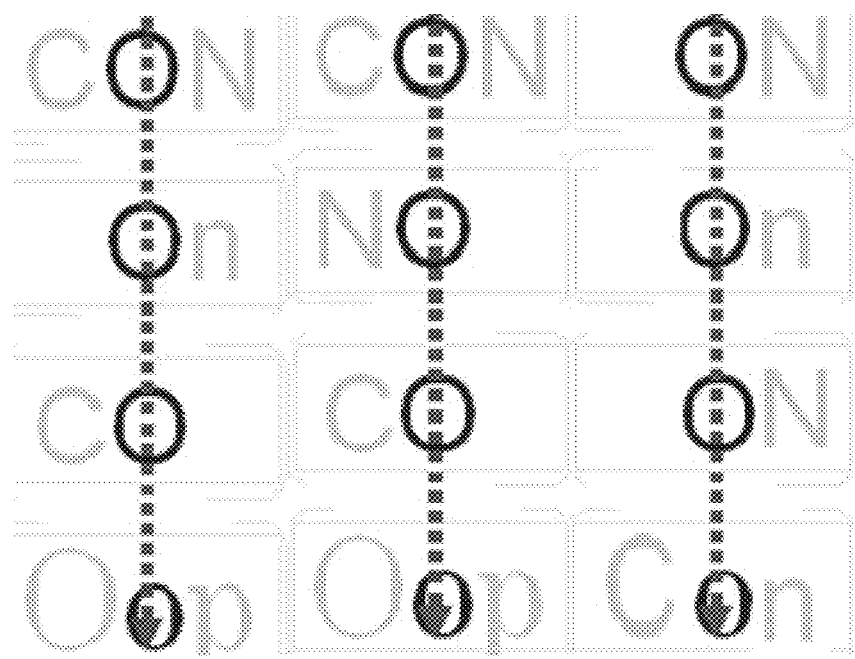
FIG. 3B illustrates an exemplary graphical user interface displayed to a human operator to allow the human operator to select, from a group of characters, those characters that do not belong to the group taking into account context information, in accordance with one embodiment.

In one implementation, the target characters in addition to context data are presented in a carpet format as shown in FIG. 3B (S350). It is noteworthy that optionally characters with same recognition results are presented together. The context data provided for a character may include one or more neighboring characters. The level or amount of context data may vary depending on the nature of a target character or its surroundings (e.g., neighboring characters), with the idea that in a preferred environment the amount of context data displayed to the user is minimized to the extent possible, while maximizing the chances for the user to be able to properly recognize a target character.

For example, if the target character is a number, X (e.g., one) neighboring character may be displayed, but if the target character is a member of the alphabet, X+N (e.g., two) neighboring characters (i.e., M characters on each side) may be displayed as a means to provide additional context data to a user to help the user determine whether the target character has been properly recognized. It is noteworthy that depending on implementation an incremental number of neighboring characters may be displayed, if the confidence level of neighboring characters continues to fall below a predetermined threshold. The lower the associated confidence level, the higher may be the amount of context data displayed for a suspect character, for example.

In one or more embodiments, the context data may be displayed in a different size, color or format (e.g., with a level of transparency or translucency) to help a target character stand out in a more ubiquitous manner from the context data. In one embodiment, optionally, a suspect character along with the context data may be presented in a carpet format among rows and columns of other suspect (or non-suspect) characters and the respective context. The target character, as displayed in its context, may be aligned with other target characters, as shown in FIG. 3B so that the human eye may more readily compare the target characters in the carpet format.

In one implementation, in the carpet format environment, the user may be presented with rows and columns of target characters that have been identified (i.e., recognized) as associated with the same alphanumeric character. As shown in FIG. 3B, a human user may quickly identify the characters that are not sufficiently uniform in comparison with the other characters displayed in the same carpet by selecting the non-conforming characters considering the presented context data (S360). Characters in the carpet that have been identified as non-conforming may be further investigated. The additional context data provided for a character in the carpet environment may advantageously help a user to more definitely and efficiently select the characters that are non-conforming.

Referring back to FIG. 3A, after the recognition process is performed and before context data is collected for the target or suspect characters (see S320, S340), the recognized characters may be clustered based on the characters' visual appearance. The clusters may be analyzed to determine if sub-clusters of characters may be recognized, where a sub-cluster includes characters that cannot be recognized with a level of certainty unless additional information (e.g., context information) for said characters is known. For example a capital "i" (i.e., "I"), a lower case L (i.e., "l") and the number one (i.e. "1") may look the same in some fonts. Thus, a recognized character may be identifies with a high level of confidence as either of the above three characters.

In the above example scenario, a further disambiguation process may be applied so that the character may be correctly recognized. As discussed above, the further disambiguation may involve obtaining and displaying context information for the suspect characters. In certain embodiments, it is desirable to reduce the number of context dependent cases. To accomplish that the clusters of characters grouped according to visual similarity are further sub-clustered, wherein certain criteria is applied to determine the suspect characters that are going to be grouped into the sub-clusters.

One criterion for grouping suspect characters into a sub-cluster is to look for characters that have been recognized with low confidence and where there is evidence of fragmentation. For example, one cluster may include regular "i" characters and also characters erroneously recognized as "i" (e.g., legs of the character "m" that is fragmented to "iii"). A sub-cluster of erroneously recognized "i" may be detected by presence of overlapping of character recognition rectangles in conjunction with low confidence in recognition results, or sequences of rectangles that form an unacceptable sequence in the language (e.g., "iii" has three too narrow rectangles). In the above scenarios that bad fragmentation may result in erroneous recognition, review of context information is helpful in arriving at correct results.

Another criterion for sub-clustering may be based on a scenario where a group of characters has recognition results with high confidence for first and second recognition choices and the choices are approximately the same or close over a group of similarly recognized characters. For example, a first suspect character may be recognized as an upper case "S" with 97% confidence, as a lower case "s" with a 96% confidence, and as the number "8" with 60% confidence. A second suspect character in the same group may be recognized as upper case "S" with 96% confidence, as a lower case "s" with a 95% confidence, and as the number "8" with 60% confidence. In such a scenario, the first and second suspect characters are grouped into a sub-cluster and the result is disambiguated based on the techniques discussed earlier.

Another criterion for sub-clustering may be based on a scenario where a group of characters has recognition results with high confidence for a first choice for the different recognition values and the characters are the same over the group of similarly recognized characters. For example, a first suspect character may be recognized as an upper case "I" with 94% confidence, as a lower case "L" with a 60% confidence, and as the number "1" with 50% confidence. A second suspect character in the same group may be recognized as number "1" with 96% confidence, as an upper case "I" with a 60% confidence, and as a lower case "L" with 50% confidence. In such a scenario, the first and second suspect characters are grouped into a sub-cluster and the result is disambiguated based on the techniques discussed earlier.

When sub-clusters are detected, it is determined whether further verification process is needed to recognize certain suspect characters with more specificity or a higher level of confidence. For example, a character may be recognized with a high level of confidence but the word containing the character may not be verifiable as a proper word (e.g., based on a spell check test). An example of this scenario would be recognizing the lower case L (i.e. "l") as the number one (i.e., "1") in the word "Apple". In this example, having knowledge of the fact that the recognized characters are used in the context of the particular word would provide improved and more accurate recognition.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
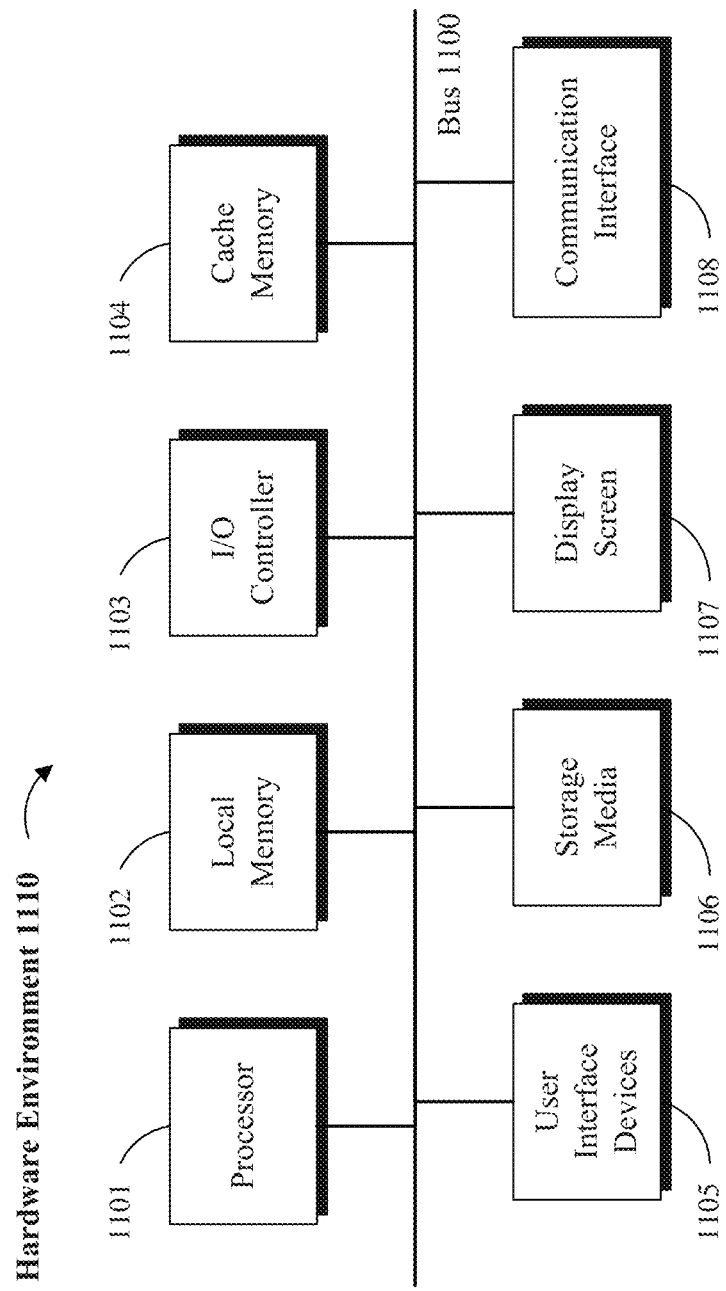
FIGS. 4A and 4B are block diagrams of hardware and software environments in which the disclosed systems and methods may operate, in accordance with one or more embodiments.
Figure 4B:
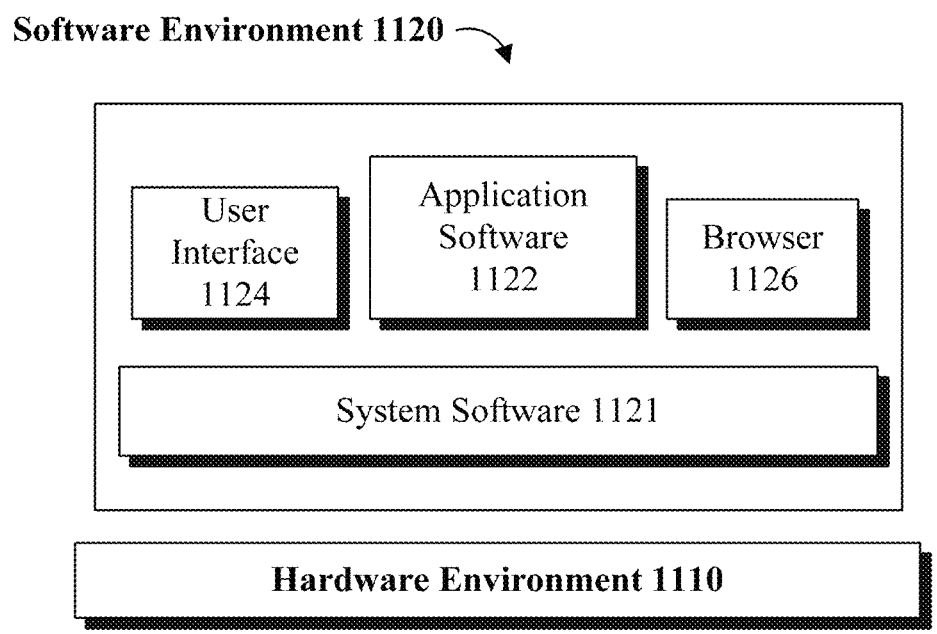

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for character recognition disambiguation, the method comprising:
   selecting, by one or more processors, a first set of characters that match a first visual profile based on results of a character recognition process applied to target content;
   selecting, by the one or more processors, a subset of the first set based on criteria associated with at least one of confidence level with which characters grouped in the subset are recognized or fragmentation associated with the characters grouped in the subset; and
   disambiguating, by the one or more processors, recognition results for the characters grouped in the subset by displaying the characters along with context information, wherein reviewing two or more of the characters on a display screen along with the context information associated with said two or more characters allows a human operator to select one or more suspect characters from among the two or more characters and wherein the context information includes one or more neighboring characters of the target content.

2. The method of claim 1, wherein a suspect character is a character that despite matching the first visual profile associated with the characters in the subset, does not belong in the subset.

3. The method of claim 1, wherein selecting a character as a suspect character from among the two or more characters grouped in the subset identifies the selected character as not belonging in the subset, despite that the selected character matches the first visual profile associated with the characters in the subset.

4. The method of claim 1 wherein the subset includes characters that have recognition results with high confidence for first and second recognition choices and the choices are approximately the same or close over a group of similarly recognized characters.

5. The method of claim 1 wherein the subset includes characters that have recognition results with high confidence for a first choice for the different recognition values and the characters are the same over the group of similarly recognized characters.

6. The method of claim 1 wherein the subset includes characters that have been recognized with low confidence and where there is evidence of fragmentation.

7. The method of claim 1 wherein the characters along with the context information are displayed in a grid format.

8. The method of claim 7 wherein the context information comprises at least one of a neighboring character for a suspect character.

9. The method of claim 8 wherein the context information is displayed in a less ubiquitous manner than the suspect character.

10. The method of claim 9 wherein the context information is displayed to extent needed for a human operator to make a determination whether the suspect character is adequate to match the first visual profile.

11. A system for character recognition disambiguation, the system comprising:
    one or more computer processors;
    one or more computer readable storage media; and
    program instructions stored on the computer readable storage media for execution by at least one of the one or more processors, the program instructions comprising:
    program instructions to selecting a first set of characters that match a first visual profile based on results of a character recognition process applied to target content;

program instructions to selecting a subset of the first set based on criteria associated with at least one of confidence level with which characters grouped in the subset are recognized or fragmentation associated with the characters grouped in the subset; and program instructions to disambiguateing recognition results for the characters grouped in the subset by displaying the characters along with context information, wherein reviewing two or more of the characters on a display screen along with the context information associated with said two or more characters allows a human operator to select one or more suspect characters from among the two or more characters and wherein the context information includes one or more neighboring characters of the target content.

12. The system of claim 11, wherein a suspect character is a character that despite matching a visual profile associated with the characters in the subset, does not belong in the subset.

13. The system of claim 11, wherein selecting a character as a suspect character from among the two or more characters grouped in the subset identifies the selected character as not belonging in the subset, despite the that the selected character matches a visual profile associated with the characters in the subset.

14. The system of claim 11 wherein the subset includes characters that have recognition results with high confidence for first and second recognition choices and the choices are approximately the same or close over a group of similarly recognized characters.

15. The system of claim 11 wherein the subset includes characters that have recognition results with high confidence for a first choice for the different recognition values and the characters are the same over the group of similarly recognized characters.

16. A method for character recognition disambiguation, the method comprising:

grouping recognized characters in a subset according to similarities in the characters' visual appearance, wherein the characters are recognized by way of an optical character recognition scheme applied to a content;

displaying the characters along with context information on a display screen in a grid format, wherein the displaying of the context information differs from the displaying of the characters by one or more of the following: size, color or format; and reviewing two or more of the characters on the display screen along with the context information associated with said two or more characters to select one or more suspect characters from among the two or more characters.

17. The method of claim 16, wherein the context information is displayed in a less ubiquitous manner that the suspect character.

18. The method of claim 16 wherein the context information is displayed to extent needed for a human operator to make a determination whether the suspect character belongs to a group of characters that match a common visual profile.

19. The method of claim 16 wherein the context information comprises at least one of a neighboring character for a suspect character.

20. A computer program product comprising a computer readable storage device and program instructions stored on the computer readable storage device, the program instructions comprising:

program instructions to select a first set of characters that match a first visual profile based on results of a character recognition process applied to target content;

program instructions to select a subset of the first set based on criteria associated with at least one of confidence level with which characters grouped in the subset are recognized or fragmentation associated with the characters grouped in the subset; and program instructions to disambiguate recognition results for the characters grouped in the subset by displaying the characters along with context information, wherein reviewing two or more of the characters on a display screen along with the context information associated with said two or more characters allows a human operator to select one or more suspect characters from among the two or more characters and wherein the context information includes one or more neighboring characters of the target content.

* * * * *